(12) United States Patent
Lee et al.

(10) Patent No.: US 11,734,877 B2
(45) Date of Patent: Aug. 22, 2023

(54) METHOD AND DEVICE FOR RESTORING IMAGE OBTAINED FROM ARRAY CAMERA

(71) Applicant: SAMSUNG ELECTRONICS CO., LTD., Suwon-si (KR)

(72) Inventors: Seho Lee, Seoul (KR); Seok Lee, Hwaseong-si (KR); Dongkyung Nam, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 77 days.

(21) Appl. No.: 17/377,627

(22) Filed: Jul. 16, 2021

(65) Prior Publication Data

US 2022/0270210 A1 Aug. 25, 2022

(30) Foreign Application Priority Data

Feb. 25, 2021 (KR) .................. 10-2021-0025724

(51) Int. Cl.
*G06T 15/20* (2011.01)
*G06T 3/00* (2006.01)
(Continued)

(52) U.S. Cl.
CPC .......... *G06T 15/205* (2013.01); *G06T 3/0093* (2013.01); *G06T 3/4046* (2013.01);
(Continued)

(58) Field of Classification Search
CPC ......... G06T 15/205; G06T 2207/20081; G06T 2207/20084; G06T 3/0093; G06T 3/4046;
(Continued)

(56) References Cited

U.S. PATENT DOCUMENTS

| 7,447,382 | B2 | 11/2008 | Nestare et al. |
| 9,445,115 | B2 | 9/2016 | DeWeert et al. |

(Continued)

FOREIGN PATENT DOCUMENTS

| KR | 10-2015-0120866 A | 10/2015 |
| KR | 10-2016-0123757 A | 10/2016 |

(Continued)

OTHER PUBLICATIONS

Shih, Kuang-Tsu, and Homer H. Chen. "Generating high-resolution image and depth map using a camera array with mixed focal lengths." IEEE Transactions on Computational Imaging 5.1 (2018): 68-81. (Year: 2018).*

(Continued)

*Primary Examiner* — John B Strege
(74) *Attorney, Agent, or Firm* — Sughrue Mion, PLLC

(57) ABSTRACT

Provided is an image restoration method of restoring an image obtained through an array camera, the image restoration method including obtaining a plurality of images through lens elements included in the array camera, obtaining a global parameter of the plurality of images, generating first processed images by transforming a viewpoint of each of the plurality of images based on the obtained global parameter, obtaining a local parameter for each pixel corresponding to each of the first processed images, generating second processed images by transforming the first processed images based on the obtained local parameter, and generating a synthesized image of a target viewpoint based on synthesizing the second processed images.

19 Claims, 10 Drawing Sheets

(51) Int. Cl.
  *G06T 3/40* (2006.01)
  *G06T 5/00* (2006.01)
  *G06T 5/50* (2006.01)

(52) U.S. Cl.
  CPC ............... *G06T 5/001* (2013.01); *G06T 5/50* (2013.01); *G06T 2207/10052* (2013.01); *G06T 2207/20016* (2013.01); *G06T 2207/20084* (2013.01); *G06T 2207/20212* (2013.01)

(58) Field of Classification Search
  CPC .............. G06T 3/4053; G06T 7/97; G06T 2207/10052; G06T 5/001–005; G06T 5/50; G06T 2207/20016; G06T 2207/20212; G06T 2207/20221; G06N 3/02–088
  See application file for complete search history.

(56) References Cited

U.S. PATENT DOCUMENTS

| | | | |
|---|---|---|---|
| 9,581,787 | B2 | 2/2017 | Wu et al. |
| 10,187,627 | B2 | 1/2019 | Cho et al. |
| 10,594,999 | B2 | 3/2020 | Stauder et al. |
| 2012/0147205 | A1* | 6/2012 | Lelescu .............. H04N 13/111 348/E5.024 |
| 2018/0352209 | A1 | 12/2018 | Liu et al. |
| 2019/0045168 | A1* | 2/2019 | Chaudhuri ............ G06T 7/55 |
| 2021/0133920 | A1 | 5/2021 | Lee et al. |

FOREIGN PATENT DOCUMENTS

| | | |
|---|---|---|
| KR | 10-2020-0031012 A | 3/2020 |
| KR | 10-2020-0038835 A | 4/2020 |

OTHER PUBLICATIONS

DeTone, Daniel, Tomasz Malisiewicz, and Andrew Rabinovich. "Deep image homography estimation." arXiv preprint arXiv: 1606.03798v1 (2016). (Year: 2016).*

Wang, Qiang, et al. "Fadnet: A fast and accurate network for disparity estimation." 2020 IEEE international conference on robotics and automation (ICRA). IEEE, 2020. (Year: 2020).*

Meng, Nan, et al. "Light Field View Synthesis via Aperture Flow and Propagation Confidence Map." arXiv preprint arXiv: 2009.02978v1 (2020). (Year: 2020).*

Zhang, Shuo, Youfang Lin, and Hao Sheng. "Residual Networks for Light Field Image Super-Resolution." 2019 IEEE/CVF Conference on Computer Vision and Pattern Recognition (CVPR). IEEE, 2019. (Year: 2019).*

Max Jaderberg et al., "Spatial Transformer Networks", Google DeepMind, Feb. 4, 2016, pp. 1-15 (15 pages total).

Kartik Venkataraman et al., "PiCam: An Ultra-Thin High Performance Monolithic Camera Array", ACM Transactions on Graphics, Nov. 2013, vol. 32, No. 6, Article 166, pp. 166:1-166:13 (13 pages total).

"3D Light-Field Vision Plenoptic Depth Cameras Metrology Software", 2008, retrieved from: https://www.lytro.com/imaging.

Xinohen Yan et al., "Perspective Transformer Nets: Learning Single-View 3D Object Reconstruction without 3D Supervision", 30th Conference on Neural Information Processing Systems, Aug. 13, 2017, pp. 1-15 (15 pages total).

Communication dated Feb. 17, 2022 issued by the European Patent Office in application No. 21191637.4.

Shih, K.-T., et al., "Generating High-Resolution Image and Depth Map Using a Camera Array With Mixed Focal Lengths", IEEE Transactions on Computational Imaging, vol. 5, No. 1, Mar. 2019, XP11709986A, pp. 68-81.

Brady, D., et al., "Deep learning for camera data acquisition, control, and image estimation", Advances in Optics and Photonics, vol. 12, No. 4, Dec. 2020, XP55887391A, pp. 787-817.

Katartzis, A., et al., "Current trends in super-resolution image reconstruction", Image Fusion: Algorithms and Applications, Jan. 1, 2008, XP55334891A, pp. 1-26.

* cited by examiner

METHOD AND DEVICE FOR RESTORING IMAGE OBTAINED FROM ARRAY CAMERA

CROSS-REFERENCE TO RELATED APPLICATION

This application claims priority to Korean Patent Application No. 10-2021-0025724 filed on Feb. 25, 2021, in the Korean Intellectual Property Office, the disclosure of which is incorporated herein by reference in its entirety.

BACKGROUND

1. Field

Example embodiments of the present disclosure relate to methods and apparatuses of a technology for restoring an image obtained through an array camera.

2. Description of Related Art

The development of an optical technology and an image processing technology has brought the widespread use of capturing devices in various fields such as multimedia contents, security, recognition, and the like. A capturing device may be provided in, for example, a mobile device, a camera, a vehicle, and a computer, to capture an image or obtain data for recognizing an object or controlling such a device. The volume of the capturing device may be determined by the size of a lens, a focal length of the lens, and the size of a sensor. To reduce the volume, a multi-lens array (MLA) including small lens elements may be used.

SUMMARY

One or more example embodiments may address at least the above problems and/or disadvantages and other disadvantages not described above. Also, the example embodiments are not required to overcome the disadvantages described above, and an example embodiment may not overcome any of the problems described above.

According to an aspect of an example embodiment, there is provided an image restoration method of restoring an image obtained through an array camera, the image restoration method including obtaining a plurality of images through lens elements included in the array camera, obtaining a global parameter of the plurality of images, generating first processed images by transforming a viewpoint of each of the plurality of images based on the obtained global parameter, obtaining a local parameter for each pixel corresponding to each of the first processed images, generating second processed images by transforming the first processed images based on the obtained local parameter, and generating a synthesized image of a target viewpoint based on synthesizing the second processed images.

The obtaining of the global parameter may include obtaining the global parameter based on a neural network model that receives the plurality of images obtained as an input.

The obtaining of the global parameter may include obtaining matrix elements included in a projection matrix.

The obtaining of the global parameter may include obtaining the global parameter based on a depth value of a scene obtained by the array camera.

The generating of the synthesized image of the target viewpoint may include generating the synthesized image with a higher resolution than a resolution of the second processed images by combining pixels of the second processed images.

The generating of the synthesized image of the target viewpoint may include generating the synthesized image from the second processed images based on pixel shuffling.

The image restoration method may further include transforming the plurality of images obtained into a plurality of high-resolution images, respectively, wherein the obtaining of the global parameter includes obtaining the global parameter based on a neural network model that receives the plurality of high-resolution images as an input.

The obtaining of the local parameter may include obtaining an offset value of a pixel position for each pixel corresponding to each of the first processed images based on a neural network model that receives the first processed images as an input.

The generating of the second processed images may include generating the second processed images by performing an image transformation on each pixel corresponding to each of the first processed images based on the offset value.

The generating of the first processed images may include warping the plurality of images obtained into the first processed images having the target viewpoint based on the global parameter.

The lens elements of the array camera may be disposed on the same plane and spaced apart from each other at a same distance.

The plurality of images obtained through the lens elements may be viewpoint images respectively corresponding to different viewpoints.

A non-transitory computer-readable storage medium may store instructions that are executable by a processor to perform the image restoration method.

According to another aspect of an example embodiment, there is provided an image restoration device including a processor, and a memory configured to store therein instructions to be executed by the processor, wherein the processor is configured to receive a plurality of images corresponding to a plurality of viewpoints, obtain a global parameter of the plurality of images, generate first processed images by transforming a viewpoint of the plurality of images based on the obtained global parameter, obtain a local parameter for each pixel corresponding to each of the first processed images, generate second processed images by transforming the first processed images based on the obtained local parameter, and generate a synthesized image of a target viewpoint by synthesizing the second processed images.

The processor may be further configured to obtain the global parameter based on a neural network model that receives the plurality of images obtained as an input.

The processor may be further configured to obtain an offset value of a pixel position for each pixel corresponding to each of the first processed images based on a neural network model that receives the first processed images as an input.

The processor may be further configured to generate the synthesized image with a higher resolution than a resolution of the second processed images by combining pixels of the second processed images.

The processor may be further configured to transform the received images into respective high-resolution images and obtain the global parameter based on a neural network model that receives the high-resolution images as an input.

According to another aspect of an example embodiment, there is provided a mobile device including an imaging device configured to obtain a plurality of images corresponding to a plurality of viewpoints, and a processor configured to obtain a global parameter of the plurality of images, generate first processed images by transforming a viewpoint of the plurality of images based on the obtained global parameter, obtain a local parameter for each pixel corresponding to each of the first processed images, generate second processed images by transforming the first processed images based on the obtained local parameter, and generate a synthesized image of a target viewpoint by synthesizing the second processed images.

According to another aspect of an example embodiment, there is provided an image restoration device including a processor, and a memory configured to store therein instructions to be executed by the processor, wherein the processor is configured to receive a plurality of images corresponding to a plurality of viewpoints, obtain a global parameter of the plurality of images, generate first processed images by transforming a viewpoint of the plurality of images based on the obtained global parameter, obtain a local parameter for pixels corresponding to the first processed images, respectively, by obtaining an offset value of a position of each of the pixels based on a neural network model that receives the first processed images as an input, generate second processed images by transforming the first processed images based on the obtained local parameter, and generate a synthesized image of a target viewpoint by synthesizing the second processed images.

BRIEF DESCRIPTION OF THE DRAWINGS

The above and/or other aspects will be more apparent by describing certain example embodiments, taken in conjunction with the accompanying drawings, in which.

DETAILED DESCRIPTION

Figure 1:
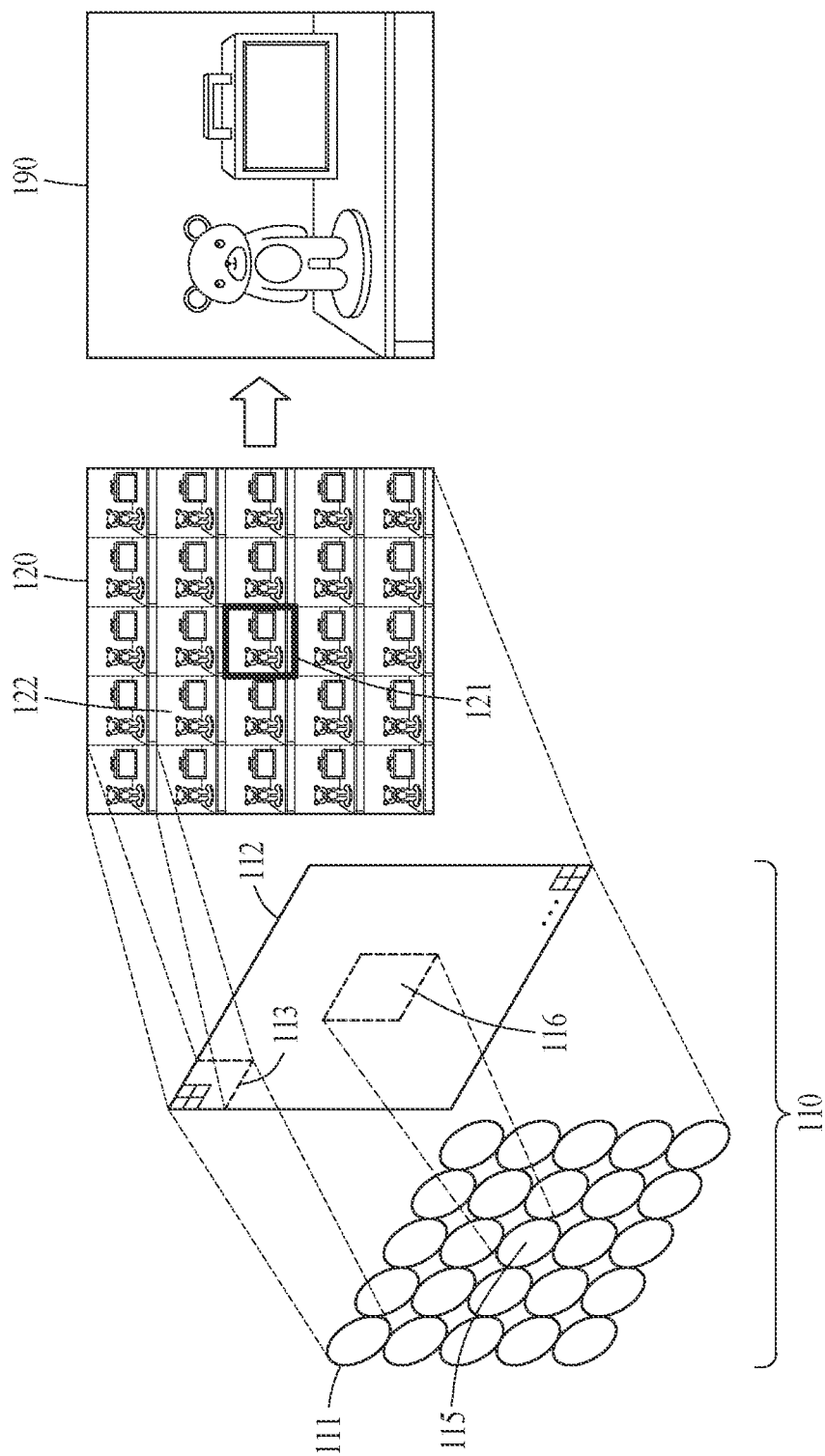
FIG. 1 is a diagram illustrating an example of an overall process of image restoration according to an example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. It should be further understood that the terms "comprises," "comprising," "includes," and/or "including," when used in this specification, specify the presence of stated features, integers, steps, operations, elements, components or a combination thereof, but do not preclude the presence or addition of one or more other features, integers, steps, operations, elements, components, and/or groups thereof. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Hereinafter, examples will be described in detail with reference to the accompanying drawings, and like reference numerals in the drawings refer to like elements throughout. Also, in the description of example embodiments, detailed description of structures or functions that are thereby known after an understanding of the disclosure of the present application will be omitted when it is deemed that such description will cause ambiguous interpretation of the example embodiments.

FIG. 1 is a diagram illustrating an example of an overall process of image restoration according to an example embodiment.

Figure 9:
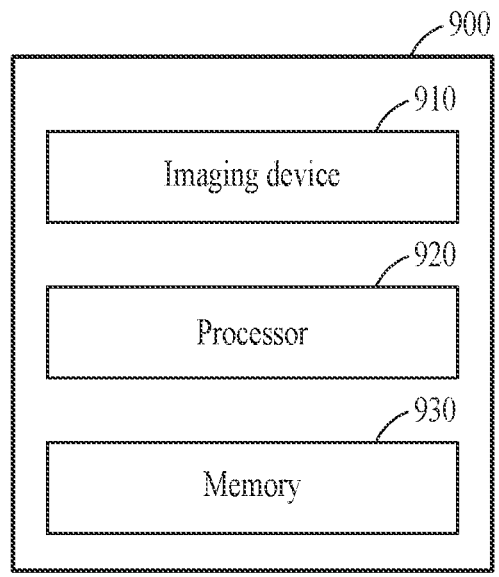
FIG. 9 is a diagram illustrating an example of an image restoration device according to an example embodiment.

Referring to FIG. 1, an image restoration device, for example, an image restoration device 900 of FIG. 9, may restore an image based on information sensed from a scene. The image restoration device includes an imaging device 110 corresponding to an array camera. The imaging device 110 includes a lens array in which a plurality of lens elements is arranged and an image sensor configured to sense light passing through each of the lens elements. The lens array may be a multi-aperture lens, such as, for example, a compound eye vision (CEV) lens. The image sensor includes a sensing array 112 in which a plurality of sensing elements is arranged on a plane.

A quality of an image to be obtained by the imaging device 110 may be determined by the number of the sensing elements included in the image sensor, and an amount of light incident on the sensing elements. A resolution of the image to be obtained may be determined by the number of the sensing elements included in the sensing array 112, and a sensitivity of the image may be determined by an amount of light incident on the sensing elements. An amount of light incident on a sensing element may be determined based on a size of the sensing element. As the size of the sensing element increases, the amount of the incident light may increase and a dynamic range of the sensing array 112 may also increase, enabling the capturing of a high-resolution image. In addition, as the number of the sensing elements included in the sensing array 112 increases, the imaging device 110 may capture a high-resolution image. As a size of a sensing element increases, the imaging device 110 may operate effectively in capturing a high-sensitive image under a low illumination condition. A sensing element may be a device configured to sense light that passes through the lens array and be, for example, an image sensing element including a complementary metal-oxide semiconductor (CMOS), a charge-coupled device (CCD), or a photodiode.

A volume of the imaging device 110 may be determined by a focal length of the lens elements included in the lens array. For example, for a sensing element of the sensing array 112 to collect light refracted by a lens element, the lens element and the sensing element may need to be disposed separately from each other by the focal length, and thus the volume of the imaging device 110 may be determined by an interval between the lens element and the sensing element. A focal length of a lens element may be determined by a viewing angle of the imaging device 110 and a size of the lens element. For example, in a case in which the viewing angle is fixed, the focal length may increase in proportion to the size of the lens element, and the size of the lens element may increase as the size of the sensing array 112 increases to capture an image in a certain viewing angle range. Thus, to increase a sensitivity of an image while maintaining a viewing angle and a resolution of the image, the size of the sensing array 112 may need to increase because a size of each sensing element needs to increase while the number of the sensing elements included in the sensing array 112 is maintained. In such a case, to maintain the viewing angle, the size of the sensing array 112 may increase and the size of the lens element may also increase, and the focal length of the lens element may thus increase and the volume of the imaging device 110 may increase accordingly.

For the imaging device 110 of a smaller size, the lens array may include the plurality of lens elements corresponding to a plurality of viewpoints. The lens elements may be arranged along a plane of the lens array. The sensing elements of the sensing array 112 may be divided into sensing regions respectively corresponding to the lens elements. The plane of the lens array and the plane of the sensing array 112 may be disposed in parallel to each other, being separated from each other by the focal length of a lens element included in the lens array. The lens array may be a micro-lens array (MLA). As a size of each of the lens elements included in the lens array decreases, a focal length of a lens element may decrease and the thickness of the imaging device 110 may thus be reduced by the decrease in the focal length. Thus, using such a lens array including the lens elements of small size, a thin camera may be embodied. The image restoration device may be provided in such a thin camera structure using an MLA to restore a high-quality and high-resolution image by more accurately performing image alignment using an image restoration method to be described hereinafter.

Each of the lens elements included in the lens array may cover a sensing region of the sensing array 112 corresponding to a lens size of a corresponding lens element. For example, as illustrated in FIG. 1, a sensing region 113 in the sensing array 112 that is covered by a corresponding lens element 111 may be determined by a lens size of the lens element 111. The sensing region 113 may correspond to a region on the sensing array 112 at which light in a certain viewing angle range arrives after passing through the lens element 111. Each of the sensing elements in the sensing array 112 may sense, as sensing information, an intensity value of the light passing through a corresponding lens element.

The imaging device 110 may be divided into a plurality of sensing units. Each of the sensing units may be distinguished by a lens element unit that is included in the lens array. For example, a sensing unit may include the lens element 111 and sensing elements of the sensing region 113 covered by the lens element 111. A position at which each lens element is disposed in the imaging device 110 may correspond to a viewpoint. A viewpoint may refer to a point from which an object is observed and/or an image of the object is captured. A plurality of low-resolution images (or viewpoint images) 120 corresponding to respective viewpoints of the lens elements may be obtained based on light received through the lens elements disposed at the viewpoints.

The low-resolution images 120 with different viewpoints may be obtained through the lens array, and a process of generating a high-resolution synthesized image 190 having a target viewpoint from the obtained low-resolution images 120 may be needed. The image restoration device to be described hereinafter may restore or generate the high-resolution synthesized image 190 by rearranging and combining the low-resolution images 120 captured from the lens elements. According to an example embodiment, the image restoration device may restore the high-resolution synthesized image 190 based on a reference image 121 among the obtained low-resolution images 120. The reference image 121 may be captured by a lens element 115 corresponding to the target viewpoint and its corresponding sensing region 116. Although the reference image 121 is illustrated as an image at the center among the images 120 in FIG. 1, the scope of examples is not limited thereto and an image, for example, an image 122, at another position may be used as a reference image. The image restoration device may obtain first processed images by performing image alignment or image warping on the different low-resolution images based on the reference image 121, obtain second processed images by performing refinement on an offset for each pixel of each of the processed images, and then synthesize the second processed images to obtain the high-resolution synthesized image 190. The image restoration device may more accurately perform the image alignment by performing the image alignment between the low-resolution images 120 using a projection matrix that is determined based on a depth value of a scene, without performing camera calibration, using intrinsic camera parameters and extrinsic camera parameters of each of the lens elements, and perform the refinement on a local offset value of each image, thereby obtaining the synthesized image 190 of a higher quality.

Figure 2:
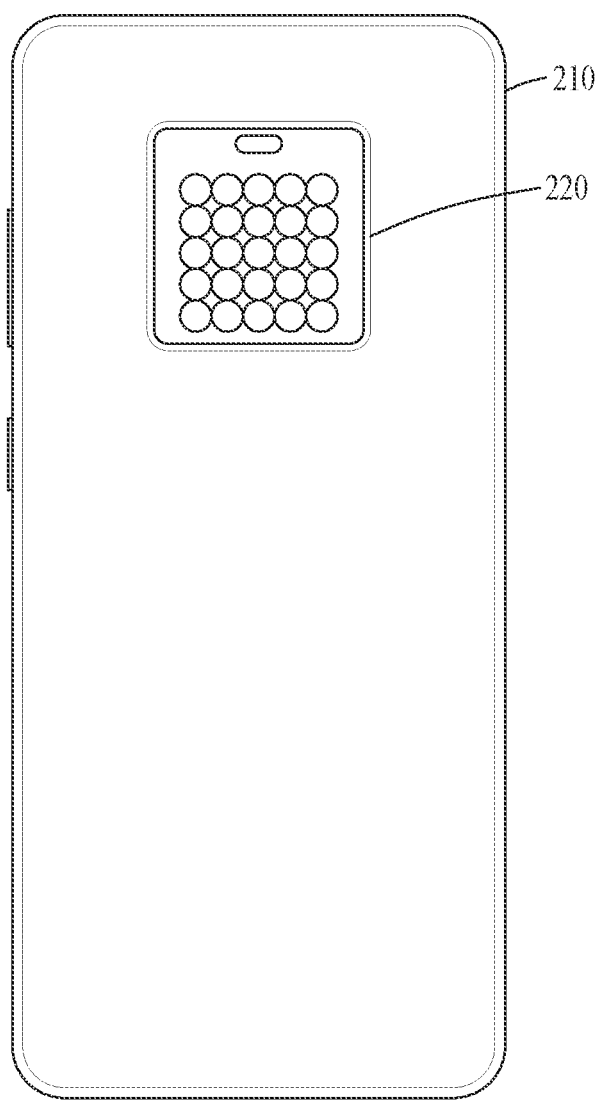
FIG. 2 is a diagram illustrating an example of a mobile device including an array camera according to an example embodiment.

FIG. 2 is a diagram illustrating an example of a mobile device including an array camera according to an example embodiment.

Referring to FIG. 2, an array camera 220 may be disposed in a mobile device 210 such as a smartphone as illustrated to capture a plurality of images. The array camera 220 may be provided in various devices including, for example, a digital single-lens reflex (DSLR) camera, a vehicle, a drone, a surveillance camera such as a closed-circuit television (CCTV) camera, a webcam camera, a virtual reality (VR) or augmented reality (AR) camera, and the like, in addition the mobile device 210. The array camera 220 may be embodied in a thin or curved structure to be used as a camera for object recognition.

The array camera 220 may include a lens array in which a plurality of lens elements is arranged, and be disposed in the front surface or rear surface of the mobile device 210. For example, the array camera 220 is illustrated as being disposed in the rear surface of the mobile device 210 in FIG. 2. The lens elements may be arranged near each other on the same plane. The array camera 220 may obtain low-resolution images of different viewpoints through the lens elements, and an image restoration device included in the mobile device 210 may restore or generate a high-resolution synthesized image by processing the low-resolution images obtained through the array camera 220.

Figure 3:
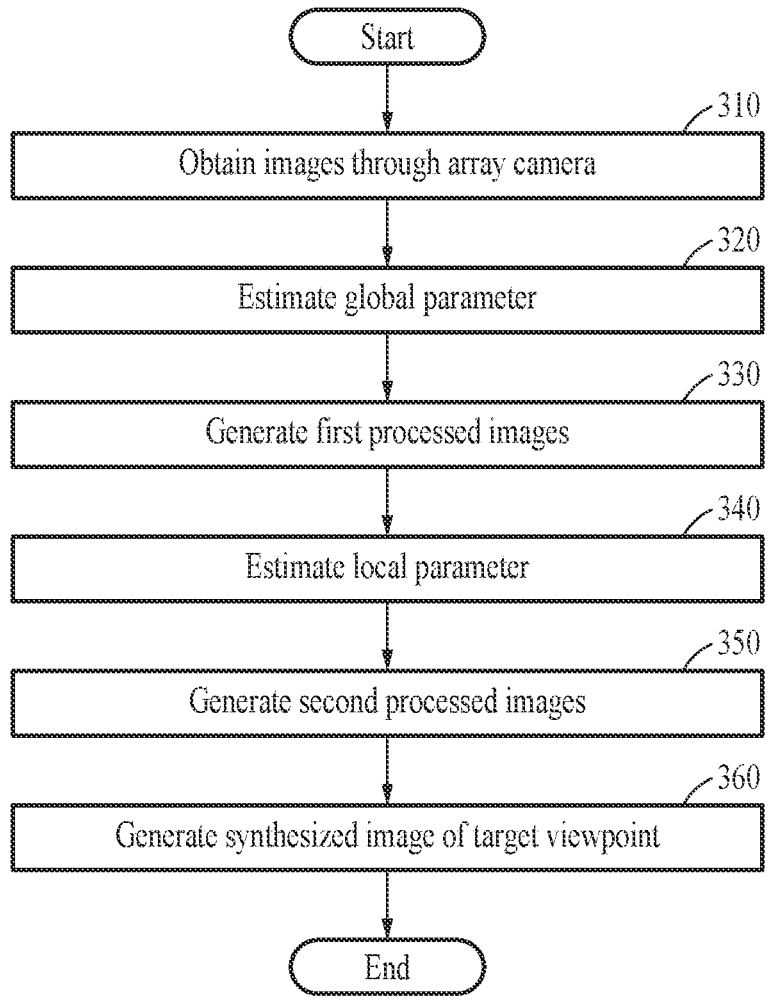
FIG. 3 is a flowchart illustrating an example of an image restoration method according to an example embodiment.

FIG. 3 is a flowchart illustrating an example of an image restoration method according to an example embodiment. The image restoration method to be described hereinafter may be performed by an image restoration device, for example, an image restoration device 900 of FIG. 9, described herein. The image restoration device may generate a high-resolution image by restoring an image obtained through an array camera.

Referring to FIG. 3, in operation 310, the image restoration device obtains a plurality of images through a plurality of lens elements included in the array camera. The lens elements of the array camera may be arranged separately and spaced apart from each other by the same interval on the same plane. The images obtained through the lens elements may be viewpoint images corresponding to different viewpoints of the lens elements.

In operation 320, the image restoration device estimates a global parameter of the images obtained in operation 310. The global parameter may refer to a parameter to be applied to the obtained images, and be used to perform image alignment or image warping that transforms a viewpoint of an image into a target viewpoint. The global parameter may include, for example, a rotation parameter, a translation parameter, and a scale parameter. The rotation parameter may indicate a level of rotation between one viewpoint and the target viewpoint. The translation parameter may indicate a level of translation between one viewpoint and the target viewpoint. The scale parameter may indicate a scale difference between one viewpoint and the target viewpoint.

The image alignment may be performed by applying a projection matrix to each of the images, and matrix elements included in the projection matrix may correspond to global parameters. The image restoration device may estimate the global parameter using a neural network model that uses the obtained images as an input. The neural network model may be a neural network that is trained to output a global parameter based on input data. The input data may include concatenated data in which the images are concatenated or data in which feature maps extracted from the images are combined. A feature map used herein may indicate feature data and/or a feature vector that is extracted from an image sensed through an individual lens element for capturing a scene. For example, the image restoration device may estimate eight matrix elements included in the projection matrix, and estimate a global parameter based on a depth value of a scene captured by the array camera.

According to another example embodiment, in operation 310, the image restoration device may obtain the images and transform the obtained images into high-resolution images, respectively. The image restoration device may estimate a global parameter using a neural network model that uses the high-resolution images as an input. The neural network model may be a neural network that is trained to output a global parameter for performing the image alignment by using, as input data, concatenated data in which the high-resolution images are concatenated or data in which feature maps extracted from the high-resolution images are combined.

In operation 330, the image restoration device generates first processed images by transforming a viewpoint of the images using the global parameter estimated in operation 320. The image restoration device may warp the images into the first processed images having the target viewpoint using the global parameter. The image restoration device may determine a projection matrix that uses the global parameter derived from the neural network model as a matrix parameter, and generate the first processed images by applying the determined projection matrix to each of the images and transforming respective viewpoints of the images into the target viewpoint. A portion of global parameters may be commonly used to transform the viewpoint of the images.

In operation 340, the image restoration device estimates a local parameter of each pixel of the first processed images. The local parameter may refer to a parameter that is applied for each pixel of a first processed image, and be used to correct a disparity error of each pixel. The local parameter may be obtained through a neural network model that is trained using the first processed images as an input. The image restoration device may obtain, as the local parameter, an offset value associated with a pixel position for each pixel of each of the first processed images using the neural network model. The offset value may include an error occurring due to misalignment, for example, an error associated with a distance value of an object, an error occurring in the image alignment, and the like.

In operation 350, the image restoration device generates second processed images by transforming the first processed images using the local parameter estimated in operation 340. The image restoration device may generate the second processed images by performing image transformation on each pixel of each of the first processed images based on the offset value associated with a pixel position obtained for each pixel of each of the first processed images. The offset value may correspond to a disparity error of a pixel, and the image restoration device may generate the second processed images by correcting the disparity error.

In operation 360, the image restoration device generates a synthesized image of the target viewpoint by synthesizing the second processed images. The image restoration device may combine pixels of the second processed images and generate the synthesized image of a higher resolution than that of the second processed images. The image restoration device may generate the synthesized image in which the second processed images are realigned to have the target viewpoint which is a single viewpoint by performing pixel shuffling on the second processed images. The pixel shuffling may include synthesizing the second processed images by realigning pixels indicating the same and/or similar points in the second processed images having a plurality of viewpoints to be adjacent to each other. The synthesized image may refer to an image in which the pixels of the second processed images are registered through image registration and may have a resolution that is higher than or equal to that of the second processed images.

Figure 4:
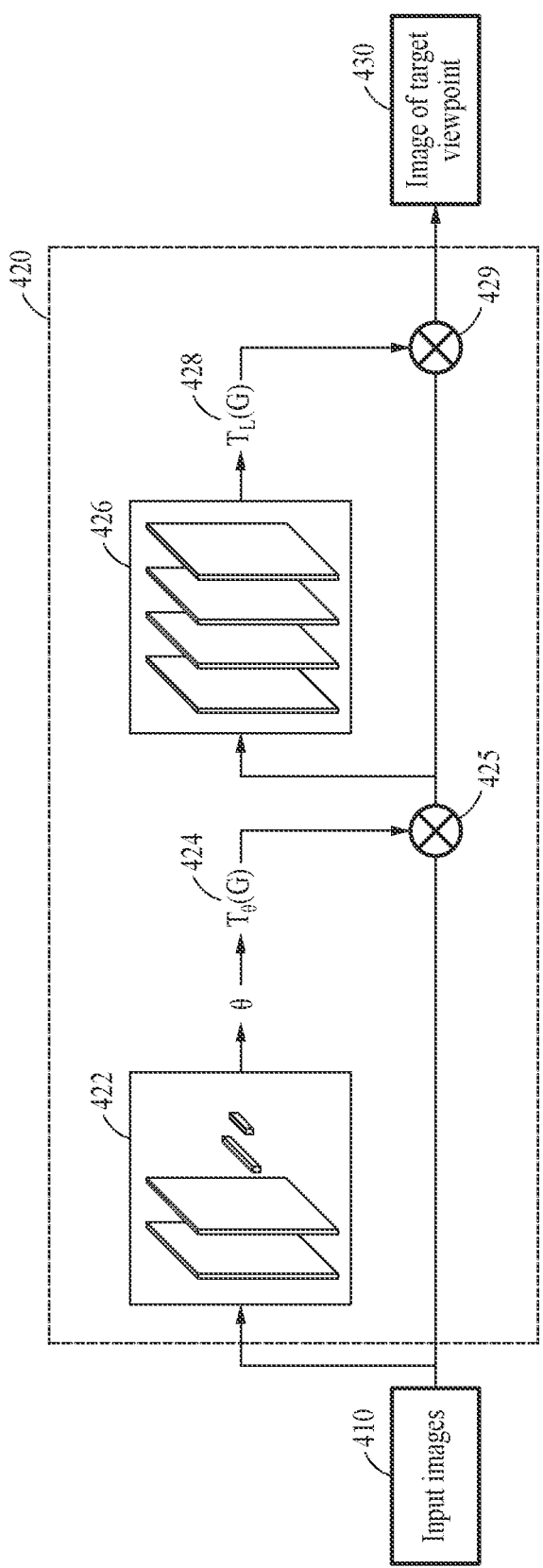
FIG. 4 is a diagram illustrating an example of generating an image of a target viewpoint according to an example embodiment.

FIG. 4 is a diagram illustrating an example of generating an image of a target viewpoint according to an example embodiment.

Referring to FIG. 4, input images 410 may be obtained through an imaging device such as an array camera. The input images 410 may correspond to a plurality of viewpoint images with lower resolutions than that of an image 430 of a target viewpoint. These viewpoint images corresponding to viewpoints of cameras included in the array camera may be obtained.

A process of obtaining the image 430 of the target viewpoint may include global transformation that performs image warping for transforming a viewpoint of the input images 410, and local offset refinement that refines an offset of a pixel position value of each pixel of an individual image. An image restoration device, for example, an image restoration device 900 of FIG. 9, may perform the image warping for image alignment between the input images 410, and restore or generate the image 430 of the target viewpoint with a high resolution from the input images 410 with a low resolution using an image processing device 420 configured to perform the offset refinement on each pixel.

The image restoration device may calculate a global parameter θ using a neural network model 422 for obtaining a global parameter, and transform viewpoint images using the global parameter θ obtained by the calculating. The image restoration device may estimate global parameters that are suitable for a structure of the imaging device using the neural network model 422 without a separate calibration process. The neural network model 422 may be a neural network that is trained to output a global parameter from information of the input images 410. The neural network may perform image restoration based on image registration by mapping input data and output data that are in a nonlinear relationship based on deep learning. Deep learning may be a machine learning method used to solve an image registration query from a big dataset and map input data and output data through supervised or unsupervised learning. The neural network may include an input layer, a plurality of hidden layers, and an output layer. Input data that is input through the input layer may be propagated through the hidden layers, and output data may be output from the output layer. However, data may be input directly to a hidden layer instead of the input layer, or the output data may be output from a hidden layer instead of the output layer. The neural network may be trained through, for example, backpropagation. The neural network model 422 may be a convolutional neural network (CNN) embodied by, for example, a combination of a convolution layer and a fully connected layer. The image restoration device may extract feature data by performing convolution filtering on data input to the convolution layer. The feature data may refer to data in which a feature of an image is abstracted and indicate, for example, a result value of a convolution operation based on a kernel of the convolution layer. However, a structure or architecture of the neural network model 422 is not limited to the foregoing, and may be embodied by various combinations.

According to an example embodiment, the image restoration device may obtain a matrix $T_\theta(G)$ 424 for transforming a single viewpoint using the neural network model 422, as represented by Equation 1. For example, the input images 410 may be input to the neural network model 422, and eight global parameters $\theta_1$ through $\theta_8$ included in the matrix $T_\theta(G)$ 424 represented as Equation 1 may be obtained from the neural network model 422.

$$\begin{bmatrix} \theta_1 & \theta_2 & \theta_3 + \dfrac{\theta_4}{Z} \\ \theta_5 & \theta_6 & \theta_7 + \dfrac{\theta_8}{Z} \end{bmatrix} \quad \text{[Equation 1]}$$

A portion of the obtained global parameters $\theta_1$ through $\theta_8$ may be commonly used in a process of image warping that transforms a viewpoint of another input image or viewpoint image. For example, in a case in which two global parameters $\theta_4$ and $\theta_8$ are used, the image restoration device may calculate a representative value such as an average value for each of the global parameters $\theta_4$ and $v_8$ obtained from respective viewpoint images, and use the calculated representative value to transform a viewpoint of each viewpoint image. The average value may be described merely as an example, and various forms of values, for example, a maximum value and a minimum value, may be used as the representative value. For the remaining global parameters $\theta_1$, $\theta_2$, $\theta_3$, $\theta_5$, $\theta_6$, and $\theta_7$, the global parameters obtained from respective viewpoint images may be used. By such common use of a global parameter, it is possible to reduce the number of global parameters needed for training or learning.

A parameter Z in the matrix $T_\theta(G)$ 424 may indicate a depth value of a scene in the input images 410. For example, when lens elements are arranged on the same plane in the imaging device and sensing elements are arranged on the same plane, depth values of a scene or an object in viewpoint images obtained from the imaging device may be considered to be the same. When the depth values are considered to be the same between the viewpoint images, the parameter Z may be considered to be the same between input images 410. In addition, when the lens elements and the sensing elements are arranged at equal intervals in an x-direction and a y-direction on the planes on which the lens elements and the sensing elements are arranged respectively, the characteristics of such arrangements of the lens elements and the sensing elements may need to be considered to reduce the number of global parameters needed for training or learning.

The image restoration device may perform the image warping that transforms a viewpoint of the input images 410 by applying, to the input images 410, the matrix $T_\theta(G)$ 424 that is based on the global parameters in operation 425. Through the image warping, as the viewpoint of the input images 410 is transformed into the same viewpoint which is the target viewpoint, first processed images may be obtained.

After performing the image warping, the image restoration device may calculate an offset value for each local position in a first processed image using a neural network model 426. The offset value may include an error, for example, a disparity error, that may occur through the image warping. The neural network model 426 may be a neural network that is trained to calculate, as an offset value for each pixel position, a feature value that is extracted after the first processed image is input and passes several convolution layers. The image restoration device may estimate a local parameter $T_L(G)$ 428 to be applied to each pixel of the first processed image based on the offset value. The image restoration device may generate a second processed image in which the offset value of each pixel of the first processed image is corrected by applying the local parameter $T_L(G)$ 428 to the first processed image in operation 429. The offset value may include a position offset in an x-axis direction and a position offset in a y-axis direction for each pixel position of the first processed image. The image restoration device may generate the second processed image corresponding to the image 430 of the target viewpoint by refining or correcting a position of each pixel of the first processed image based on the offset value. The image restoration device may also perform the same process described in the foregoing on other first processed images to generate corresponding second processed images, and generate a synthesized image of a single target viewpoint or a reference viewpoint by synthesizing the second processed images. The image restoration device may generate the synthesized image with a higher resolution than that of the second processed images by combining pixels of the second processed images through pixel shuffling.

Figure 5:
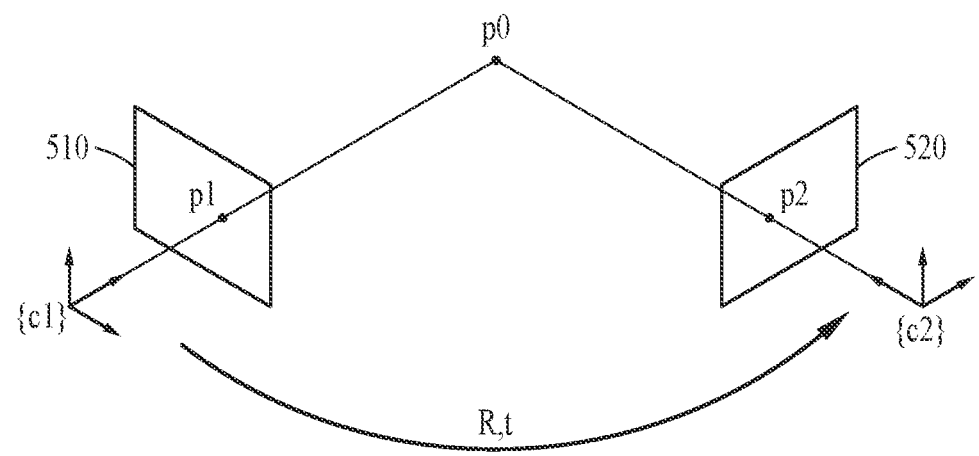
FIG. 5 is a diagram illustrating an example of performing image warping according to an example embodiment.

FIG. 5 is a diagram illustrating an example of performing image warping according to an example embodiment.

An image restoration device may perform image warping using a trained neural network model without camera calibration for image alignment between low-resolution viewpoint images obtained through an array camera. A viewpoint transformation of a viewpoint image may be performed as follows through an image transformation model between two different independent cameras.

Referring to FIG. 5, illustrated is a relationship between two-dimensional (2D) positions p1 and p2 in respective viewpoint images 510 and 520 of two different cameras with respect to a single three-dimensional (3D) point p0. For example, in a case in which coordinates of the position p1 of the point p0 in the first viewpoint image 510 captured by a first camera are $(x_{c1}, y_{c1})$ and coordinates of the position p2 of the point p0 in the second viewpoint image 520 captured by a second camera are $(x_{c2}, y_{c2})$, and coordinates of the 3D point p0 represented based on a coordinate system of the first camera are $(X_{c1}, Y_{c1}, Z_{c1})$ and coordinates of the 3D point p0 represented based on a coordinate system of the second camera are $(X_{c2}, Y_{c2}, Z_{c2})$, a relationship between these coordinates may be represented by Equations 2 through 4 as below.

$$Z_{c2} \begin{bmatrix} x_{c2} \\ y_{c2} \\ 1 \end{bmatrix} = \begin{bmatrix} X_{c2} \\ Y_{c2} \\ Z_{c2} \end{bmatrix} \quad \text{[Equation 2]}$$

$$\begin{bmatrix} X_{c2} \\ Y_{c2} \\ Z_{c2} \\ 1 \end{bmatrix} = \begin{bmatrix} \theta_1 & \theta_2 & \theta_3 & \theta_4 \\ \theta_5 & \theta_6 & \theta_7 & \theta_8 \\ \theta_9 & \theta_{10} & \theta_{11} & \theta_{12} \\ \theta_{13} & \theta_{14} & \theta_{15} & \theta_{16} \end{bmatrix} \begin{bmatrix} X_{c1} \\ Y_{c1} \\ Z_{c1} \\ 1 \end{bmatrix} \quad \text{[Equation 3]}$$

$$\begin{bmatrix} X_{c1} \\ Y_{c1} \\ Z_{c1} \end{bmatrix} = \begin{bmatrix} Z_{c1} x_{c1} \\ Z_{c1} y_{c1} \\ Z_{c1} \end{bmatrix} = Z_{c1} \begin{bmatrix} x_{c1} \\ y_{c1} \\ 1 \end{bmatrix} \quad \text{[Equation 4]}$$

Equation 2 represents a projection from 3D into 2D, and Equation 4 represents a projection from 2D into 3D. Equation 3 represents an application of homography. A transformation between 3D points may be represented by 3D homography that is represented with 16 independent parameters, and the 3D homography may be the same as obtained by multiplying matrices that are based on a camera intrinsic parameter and a camera extrinsic camera, as represented by Equation 5.

$$\begin{bmatrix} \theta_1 & \theta_2 & \theta_3 & \theta_4 \\ \theta_5 & \theta_6 & \theta_7 & \theta_8 \\ \theta_9 & \theta_{10} & \theta_{11} & \theta_{12} \\ \theta_{13} & \theta_{14} & \theta_{15} & \theta_{16} \end{bmatrix} = \begin{bmatrix} K & 0 \\ 0^T & 1 \end{bmatrix} \begin{bmatrix} R & t \\ 0^T & 1 \end{bmatrix} \quad \text{[Equation 5]}$$

In Equation 5, R and t denote camera extrinsic parameters indicating a rotation and a translation, respectively. K denotes a camera intrinsic parameter, and T denotes a transpose.

Under the assumption that depth values of a scene in the viewpoint images are the same as in $Z_{c1}=Z_{c2}=Z$, a transformation equation with respect to $(x_{c2}, y_{c2})$ in Equation 6 may be represented based on a 2D homography dependent on Z, as represented by Equation 7.

$$\begin{bmatrix} Zx_{c2} \\ Zy_{c2} \\ Z \\ 1 \end{bmatrix} = \begin{bmatrix} \theta_1 & \theta_2 & \theta_3 & \theta_4 \\ \theta_5 & \theta_6 & \theta_7 & \theta_8 \\ \theta_9 & \theta_{10} & \theta_{11} & \theta_{12} \\ \theta_{13} & \theta_{14} & \theta_{15} & \theta_{16} \end{bmatrix} \begin{bmatrix} Zx_{c1} \\ Zy_{c1} \\ Z \\ 1 \end{bmatrix} \quad \text{[Equation 6]}$$

$$\begin{bmatrix} x_{c2} \\ y_{c2} \\ 1 \end{bmatrix} = \begin{bmatrix} \theta_1 & \theta_2 & \theta_3 + \dfrac{\theta_4}{Z} \\ \theta_5 & \theta_6 & \theta_7 + \dfrac{\theta_8}{Z} \end{bmatrix} \begin{bmatrix} x_{c1} \\ y_{c1} \\ 1 \end{bmatrix} \quad \text{[Equation 7]}$$

Based on Equation 7, the number of global parameters needed for image warping on viewpoint images may be a value obtained by multiplying the number of $\theta_1$ through $\theta_8$ which is eight and the number of cameras. Referring to Equation 7, the image warping or the image coordinate transformation between two cameras with respect to a 3D point having the same depth value may be performed by applying a matrix including eight independent global parameters to a coordinate value of a pixel of a viewpoint image.

Figure 6:
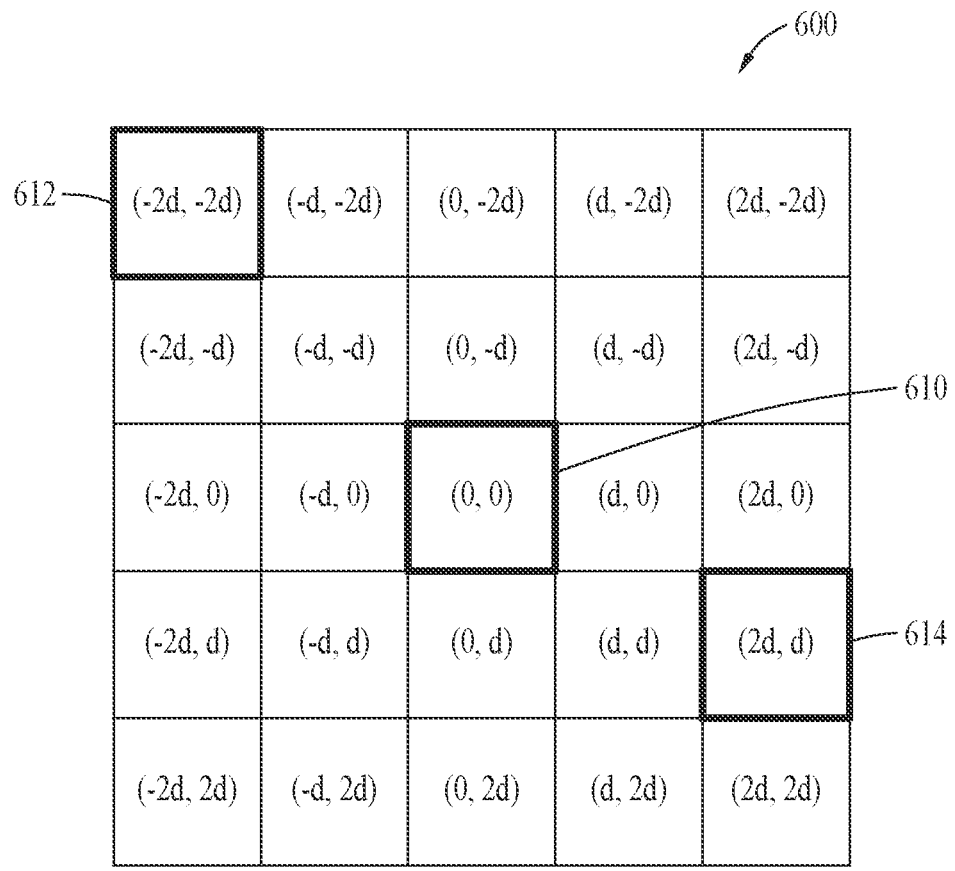
FIG. 6 is a diagram illustrating an example of a position relationship between sensing elements included in an array camera according to an example embodiment.

FIG. 6 is a diagram illustrating an example of a position relationship between sensing elements included in an array camera according to an example embodiment.

When a surface on which lens elements are arranged in an array camera and a surface on which sensing elements are arranged in the array camera are the same plane, depth values of a scene or an object in viewpoint images captured by the array camera may be the same. In addition, positions in the array camera at which the lens elements and the sensing elements are arranged are already known, translation information between cameras may not be independent of each other. Based on such constraints, an image transformation may be represented with a fewer number of global parameters. For example, in a case in which sensing elements (or lens elements) 600 of a 5×5 array camera in which the sensing elements 600 are arranged at an equidistant interval with a horizontal distance d and a vertical distance d have a position relationship illustrated in FIG. 6, capturing surfaces from which viewpoint images are captured may be present on the same plane, and a distance between neighboring sensing elements may be different by the horizontal distance d and the vertical distance d. Under the assumption that a position of a sensing element 640 disposed at the center is (0, 0), a position of a sensing element 612 may be defined as (−2d, −2d) and a position of a sensing element 614 may be defined as (2d, 2d).

When an interval is preset as d based on the sensing element 610 which is a reference in the array camera and there is no movement in a z-direction, a component by a translation may occur in proportion to the interval for each camera. In an image transformation between two cameras, a coordinate translation component that occurs by a translation may be inversely proportional to a depth value, but be proportional to a magnitude of a translation in an x-direction and a y-direction. In a case in which an index of each camera included in the array camera is represented as (i, j), image warping may be represented by Equation 8 based on camera arrangement information.

$$\begin{bmatrix} x'_{c(i,j)} \\ y'_{c(i,j)} \end{bmatrix} = \begin{bmatrix} \theta_1(i,j) & \theta_2(i,j) & \theta_3(i,j) + \dfrac{i\theta_4}{Z} \\ \theta_5(i,j) & \theta_6(i,j) & \theta_7(i,j) + \dfrac{j\theta_8}{Z} \end{bmatrix} \begin{bmatrix} x_{c(i,j)} \\ y_{c(i,j)} \end{bmatrix}$$ [Equation 8]

$$i = -2, \ldots, 2$$
$$j = -2, \ldots, 2$$

In Equation 8, $\theta_4$ and $\theta_8$ may correspond to image coordinate translation components that occur as a camera moves by an interval of d in the x-direction and the y-direction, respectively, and be commonly used for image warping between different viewpoint images. By commonly using $\theta_4$ and $\theta_8$, the number of global parameters needed to perform the image warping in the case of the 5×5 array camera may be reduced from 200 (=8 [the number of $\theta_1$ through $\theta_8$]×25 [number of individual cameras included in the ×5 array camera]) to 152 (=6 [the number of $\theta_1$, $\theta_2$, $\theta_3$, $\theta_5$, $\theta_6$, and $\theta_7$]×25 [the number of individual cameras included in the ×5 array camera]+2 [the number of $\theta_4$ and $\theta_8$]).

Figure 7:
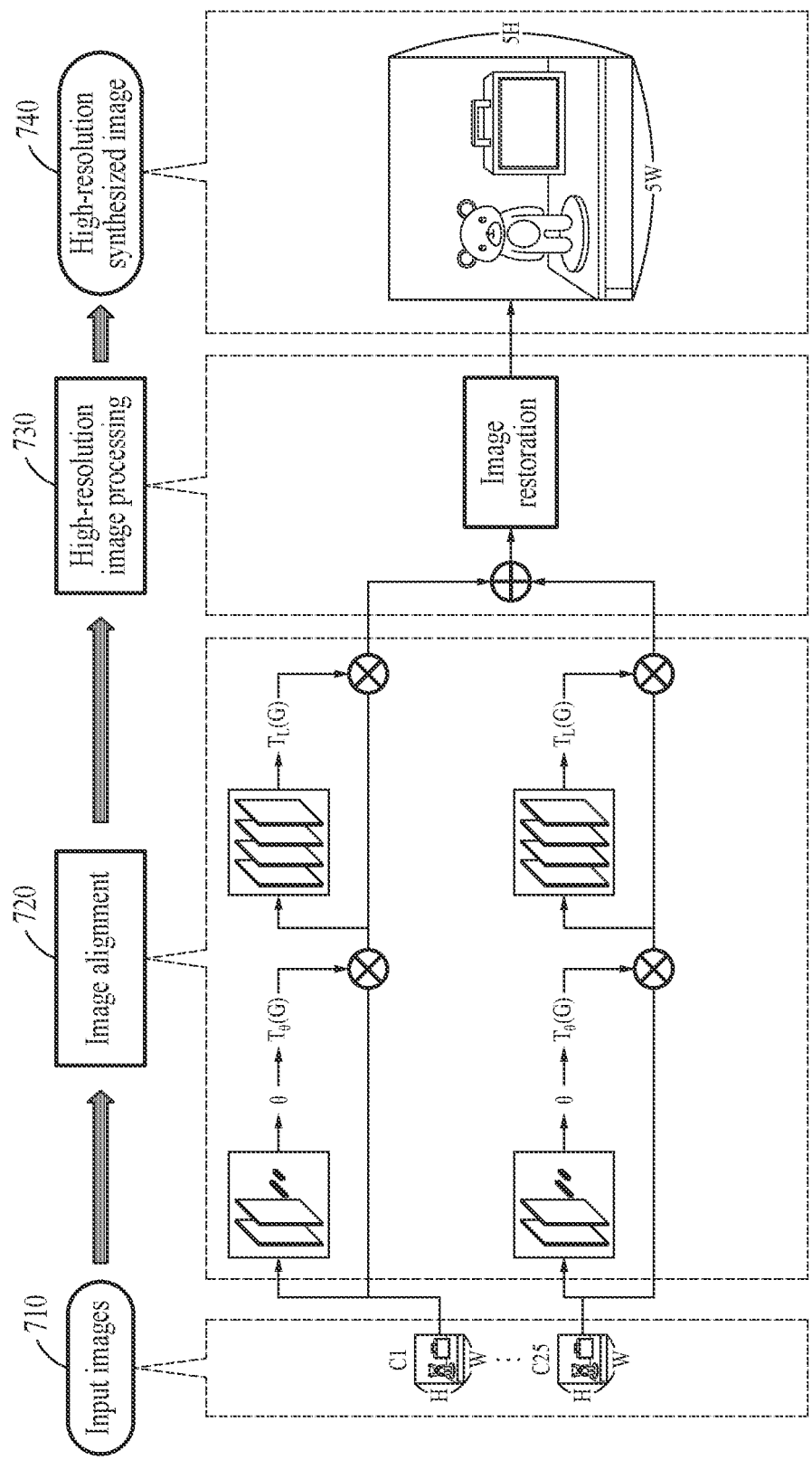
FIG. 7 is a diagram illustrating an example of generating a synthesized image according to an example embodiment.

FIG. 7 is a diagram illustrating an example of generating a synthesized image according to an example embodiment.

Referring to FIG. 7, an image restoration device may generate first processed images by transforming a viewpoint of low-resolution input images 710, for example, 25 viewpoint images C1 through C25 with a height H×a width W, into a target viewpoint through image alignment 720, and generate second processed images by refining or correcting an offset value of a pixel position for each of the first processed images. Here, H denotes the number of pixels arranged along the height of the input images 710, and W denotes the number of pixels arranged along the width of the input images 710, each of which may be a natural number greater than or equal to 1.

The image restoration device may generate a high-resolution synthesized image 740, for example, a synthesized image with a height 5 H×a width 5 W, by performing high-resolution image processing 730 that restores a high-resolution image by merging or synthesizing the second processed images. The image restoration device may perform the high-resolution image processing 730 including pixel concatenation and pixel shuffling on the second processed images.

Figure 8:
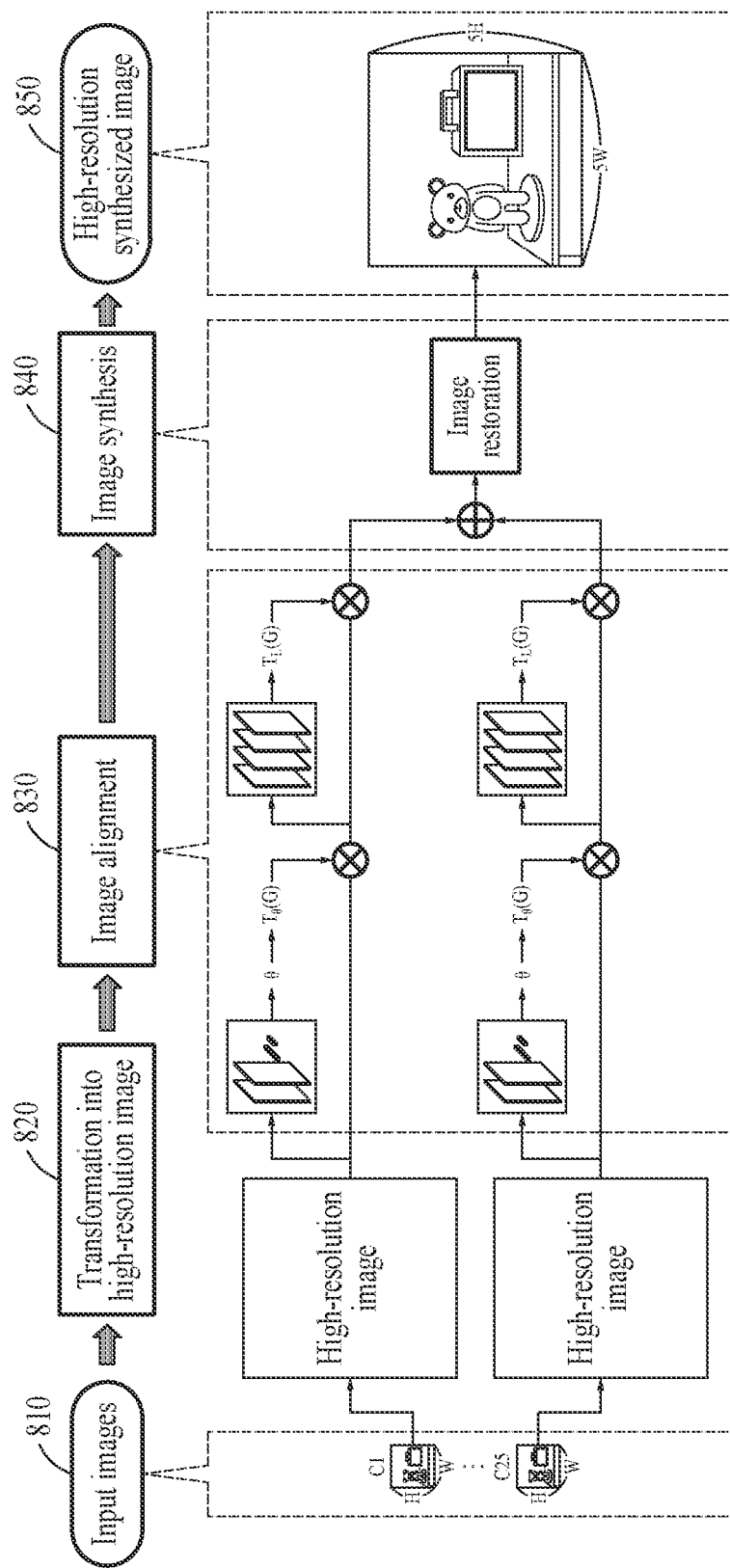
FIG. 8 is a diagram illustrating another example of generating a synthesized image according to an example embodiment.

FIG. 8 is a diagram illustrating another example of generating a synthesized image according to an example embodiment.

Referring to FIG. 8, an image restoration device may perform an image transformation 820 on each of low-resolution input images 810, for example, 25 viewpoint images C1 through C25 with a height H×a width W, to transform them into high-resolution images. Subsequently, the image restoration device may perform image warping that transforms the high-resolution images into respective images having a target viewpoint in a process of image alignment 830. Through the image warping performed on the high-resolution images by the image restoration device, the accuracy of the image warping may be higher than the accuracy obtained from the example described above with reference to FIG. 7. The image restoration device may perform image synthesis 840 that merges or synthesizes the images having the target viewpoint through pixel concatenation and generate a high-resolution synthesized image 850, for example, a synthesized image with a height 5 H×a width 5 W.

FIG. 9 is a diagram illustrating an example of an image restoration device according to an example embodiment.

Referring to FIG. 9, an image restoration device 900 includes an imaging device 910, a processor 920, and a memory 930. According to examples, the imaging device 910 may be provided separately from the image restoration device 900, or be embodied in an integral form with the image restoration device 900.

The imaging device 910 may obtain a plurality of images corresponding to a plurality of viewpoints. The imaging device 910 may correspond to an array camera configured to obtain a plurality of images through an MLA including lens elements arranged at different positions. The imaging device 910 may capture a multi-lens image including a plurality of viewpoint images corresponding to a plurality of viewpoints, and the processor 920 may generate input data from the multi-lens image.

The memory 930 may store, temporarily or permanently, data needed for performing the image restoration method described herein. For example, the memory 930 may store therein the images obtained by the imaging device 910, various parameters, for example, a global parameter, a local parameter, etc., a neural network model that estimates a parameter for image restoration, and a synthesized image.

The processor 920 may control an overall operation of the image restoration device 900, and execute functions and instructions to be executed in the image restoration device 900. The processor 920 may receive the images corresponding to the viewpoints from the imaging device 910, and estimate a global parameter of the images using a trained neural network model that uses the obtained images as an input. The processor 920 may define a projection matrix based on the estimated global parameter, and generate first processed images by applying the projection matrix to each of the images and transforming a viewpoint of the images thereby. The processor 920 may obtain, as a local parameter, an offset value of a pixel position for each pixel of each of the first processed images using a trained neural network model that uses the first processed images as an input. The processor 920 may generate second processed images by correcting the offset value for each pixel of each of the first processed images, and generate a synthesized image of a target viewpoint by synthesizing the second processed images. The processor 920 may generate the synthesized image with a higher resolution than that of the second processed images by combining pixels of the second processed images through pixel shuffling. However, operations of the processor 920 are not limited to the foregoing, and the processor 920 may perform one or more, or all, of the operations or methods described above with reference to FIGS. 1 through 8, simultaneously or sequentially.

Figure 10:
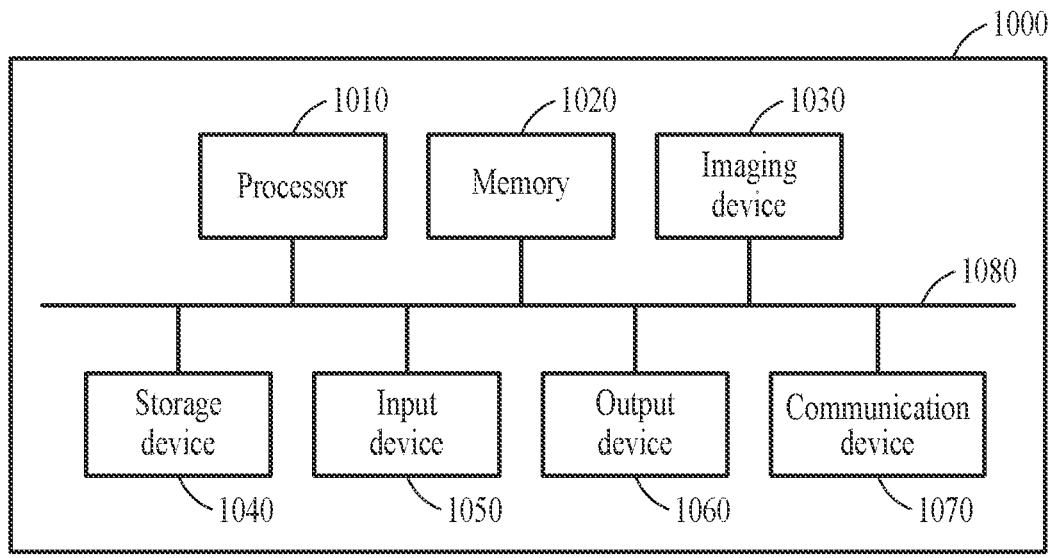
FIG. 10 is a diagram illustrating an example of an electronic device according to an example embodiment.

FIG. 10 is a diagram illustrating an example of an electronic device according to an example embodiment.

An electronic device 1000 may refer to a device configured to perform the image restoration method described above to generate a high-resolution synthesized image, and perform a function of the image restoration device 900 described above with reference to FIG. 9. The electronic device 1000 may be a mobile device, such as, for example, an image processing device, a smartphone, a wearable device, a tablet computer, a netbook, a personal digital assistant (PDA), a head-mounted display (HMD), a camera device, and the like. The electronic device 1000 may be embodied as a vision camera device for a vehicle, a drone, and a closed-circuit television (CCTV), a webcam camera for a video call, a 360° image-capturing camera device, a virtual reality (VR) camera device, an augmented reality (AR) camera device, or the like.

Referring to FIG. 10, the electronic device 1000 includes a processor 1010, a memory 1020, an imaging device 1030, a storage device 1040, an input device 1050, an output device 1060, and a communication device 1070. Such components of the electronic device 1000 may communicate with one another through a communication bus 1080.

The processor 1010 may control an overall operation of the electronic device 1000 and execute functions and instructions to be executed in the electronic device 1000. The processor 1010 may perform one or more, or all, of the operations or methods described above with reference to FIGS. 1 through 9.

The memory 1020 may store therein information needed for the processor 1010 to perform the image restoration method described herein. For example, the memory 1020 may store instructions to be executed by the processor 1010, and related information while software or program is being executed in the electronic device 1000. The memory 1020 may include a random-access memory (RAM), a dynamic RAM (DRAM), a static RAM (SRAM), or a nonvolatile memory of another form that is known in the related technical field.

The imaging device 1030 may include an array camera and obtain images respectively corresponding to a plurality of lens elements. The electronic device 1000 may generate a high-resolution synthesized image by performing image restoration based on the obtained images.

The storage device 1040 may include a computer-readable storage medium or device, and store a low-resolution image and an enhanced image. The storage device 1040 may include, for example, a storage, a magnetic hard disk, an optical disc, a flash memory, an electrically erasable programmable read-only memory (EEPROM), and the like.

The input device 1050 may receive an input from a user through a tactile input, a video input, an audio input, and a touch input, as a non-limiting example. The input device 1050 may include, as a non-limiting example, a keyboard, a mouse, a touchscreen, a microphone, and other devices configured to detect the input from the user and transfer the detected input to the electronic device 1000.

The output device 1060 may provide the user with an output of the electronic device 1000 through a visual, audio, or tactile channel. The output device 1060 may include, as a non-limiting example, a display, a touchscreen, a speaker, a vibration generator, and other devices configured to provide the user with the output. The communication device 1070 may communicate with an external device through a wired or wireless network.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

Example embodiments include non-transitory computer-readable media including program instructions to implement various operations embodied by a computer. The media may also include, alone or in combination with the program instructions, data files, data structures, tables, and the like. The media and program instructions may be those specially designed and constructed for the purposes of example embodiments, or they may be of the kind well known and available to those having skill in the computer software arts. Examples of non-transitory computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random-access memory (RAM). Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

The foregoing example embodiments are merely exemplary and are not to be construed as limiting. The present teaching can be readily applied to other types of apparatuses. Also, the description of the example embodiments is intended to be illustrative, and not to limit the scope of the claims, and many alternatives, modifications, and variations will be apparent to those skilled in the art.

While example embodiments have been described with reference to the figures, it will be understood by those of ordinary skill in the art that various changes in form and details may be made therein without departing from the spirit and scope as defined by the following claims and their equivalents.

What is claimed is:

1. An image restoration method of restoring an image obtained through an array camera, the image restoration method comprising:
   obtaining a plurality of images through lens elements included in the array camera;
   obtaining a global parameter of the plurality of images based on a depth value of a scene obtained by the array camera;
   generating first processed images by transforming a viewpoint of each of the plurality of images based on the obtained global parameter;
   obtaining a local parameter for each pixel corresponding to each of the first processed images;
   generating second processed images by transforming the first processed images based on the obtained local parameter; and
   generating a synthesized image of a target viewpoint based on synthesizing the second processed images.

2. The image restoration method of claim 1, wherein the obtaining of the global parameter comprises:
   obtaining the global parameter based on a neural network model that receives the plurality of images obtained as an input.

3. The image restoration method of claim 2, wherein the obtaining of the global parameter comprises:
   obtaining matrix elements included in a projection matrix.

4. The image restoration method of claim 1, wherein the generating of the synthesized image of the target viewpoint comprises:
   generating the synthesized image with a higher resolution than a resolution of the second processed images by combining pixels of the second processed images.

5. The image restoration method of claim 4, wherein the generating of the synthesized image of the target viewpoint comprises:
   generating the synthesized image from the second processed images based on pixel shuffling.

6. The image restoration method of claim 1, further comprising:
   transforming the plurality of images into a plurality of higher-resolution images that have higher resolutions than resolutions of the plurality of images, respectively,
   wherein the obtaining of the global parameter comprises
   obtaining the global parameter based on a neural network model that receives the plurality of higher-resolution images as an input.

7. The image restoration method of claim 1, wherein the obtaining of the local parameter comprises:
   obtaining an offset value of a pixel position for each pixel corresponding to each of the first processed images based on a neural network model that receives the first processed images as an input.

8. The image restoration method of claim 7, wherein the generating of the second processed images comprises:
   generating the second processed images by performing an image transformation on each pixel corresponding to each of the first processed images based on the offset value.

9. The image restoration method of claim 1, wherein the generating of the first processed images comprises:
   warping the plurality of images obtained into the first processed images having the target viewpoint based on the global parameter.

10. The image restoration method of claim 1, wherein the lens elements of the array camera are disposed on the same plane and spaced apart from each other at a same distance.

11. The image restoration method of claim 1, wherein the plurality of images obtained through the lens elements are viewpoint images respectively corresponding to different viewpoints.

12. A non-transitory computer-readable storage medium storing instructions that are executable by a processor to perform the image restoration method of claim 1.

13. An image restoration device comprising:
   a processor; and
   a memory configured to store therein instructions to be executed by the processor,
   wherein the processor is configured to:
      receive a plurality of images corresponding to a plurality of viewpoints via an array camera;
      estimate a global parameter of the plurality of images based on a depth value of a scene obtained by the array camera;
      generate first processed images by transforming a viewpoint of the plurality of images based on the obtained global parameter;
      obtain a local parameter for each pixel corresponding to each of the first processed images;
      generate second processed images by transforming the first processed images based on the obtained local parameter; and
      generate a synthesized image of a target viewpoint by synthesizing the second processed images.

14. The image restoration device of claim 13, wherein the processor is further configured to:
   obtain the global parameter based on a neural network model that receives the plurality of images obtained as an input.

15. The image restoration device of claim 13, wherein the processor is further configured to:
   obtain an offset value of a pixel position for each pixel corresponding to each of the first processed images based on a neural network model that receives the first processed images as an input.

16. The image restoration device of claim 13, wherein the processor is further configured to:
   generate the synthesized image with a higher resolution than a resolution of the second processed images by combining pixels of the second processed images.

17. The image restoration device of claim 13, wherein the processor is further configured to:
   transform the received images into respective higher-resolution images that have higher resolutions than resolutions of the received images, and obtain the global parameter based on a neural network model that receives the higher-resolution images as an input.

18. A mobile device comprising:
   an imaging device comprising an array camera, and configured to obtain a plurality of images corresponding to a plurality of viewpoints; and
   a processor configured to:
      obtain a global parameter of the plurality of images based on a depth value of a scene obtained by the array camera;
      generate first processed images by transforming a viewpoint of the plurality of images based on the obtained global parameter;
      obtain a local parameter for each pixel corresponding to each of the first processed images;
      generate second processed images by transforming the first processed images based on the obtained local parameter; and generate a synthesized image of a target viewpoint by synthesizing the second processed images.

19. An image restoration device comprising:
a processor; and
a memory configured to store therein instructions to be executed by the processor,
wherein the processor is configured to:
  receive a plurality of images corresponding to a plurality of viewpoints through lens elements included in an array camera;
  obtain a global parameter of the plurality of images based on a depth value of a scene obtained by the array camera;
  generate first processed images by transforming a viewpoint of the plurality of images based on the obtained global parameter;
  obtain a local parameter for pixels corresponding to the first processed images, respectively, by obtaining an offset value of a position of each of the pixels based on a neural network model that receives the first processed images as an input;
  generate second processed images by transforming the first processed images based on the obtained local parameter; and
  generate a synthesized image of a target viewpoint by synthesizing the second processed images,
wherein the plurality of images obtained through the lens elements are viewpoint images respectively corresponding to different viewpoints.

* * * * *